J. M. Mansfield.
Horse Hay Fork.
№ 69353. Patented Oct. 1, 1867.
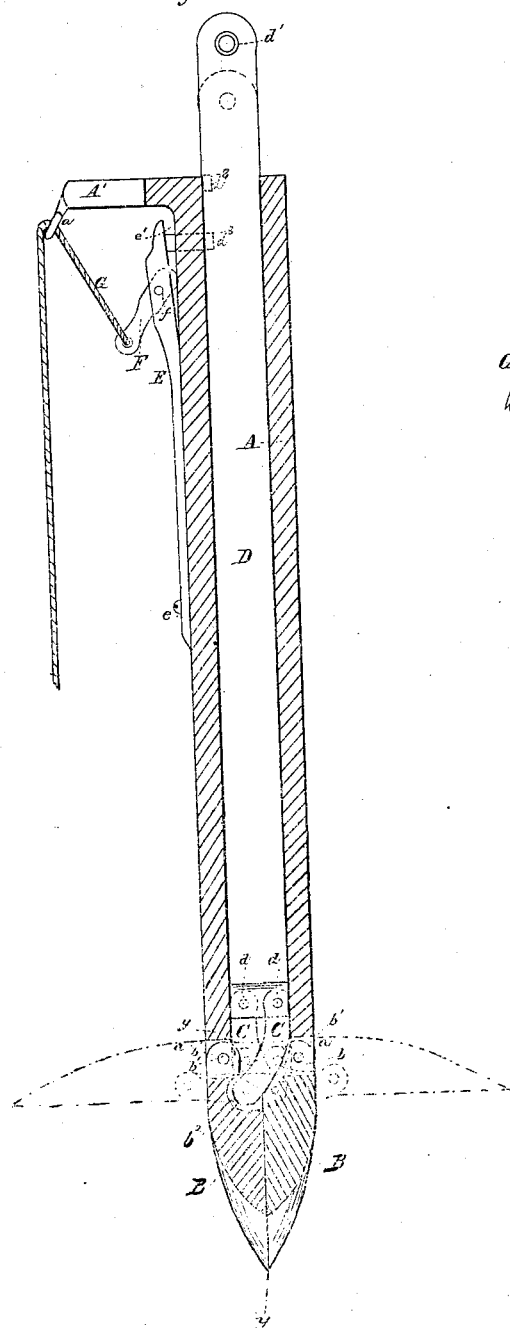
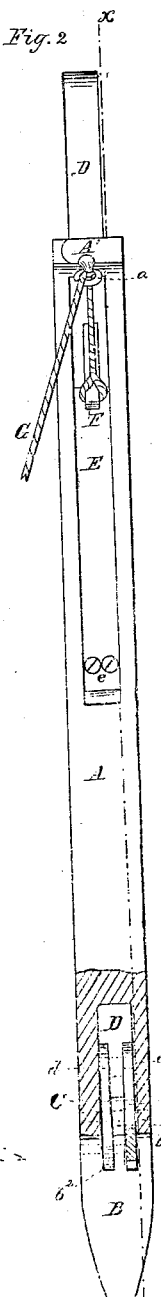
Witnesses
H. W. Bowen
T. Scherlin
Inventor
J. M. Mansfield
By Kinghorn
Attorneys

United States Patent Office.

JOSHUA M. MANSFIELD, OF WATERTOWN, NEW YORK.

Letters Patent No. 69,353, dated October 1, 1867

IMPROVEMENT IN HORSE HAY-FORKS.

*The Schedule referred to in these Letters Patent and making part of the same.*

TO ALL WHOM IT MAY CONCERN:

Be it known that I, JOSHUA M. MANSFIELD, of Watertown, Jefferson county, State of New York, have invented new and useful Improvements in Horse Hay-Forks; and I do hereby declare that the following is a full, clear, and exact description thereof, which will enable others skilled in the art to make and use the same, reference being had to the accompanying drawing, forming part of this specification.

My invention relates to that class of horse hay-forks called "harpoon-forks," and to that class of them where the points are hinged to the body of the fork, so that when closed they may be easily driven into the hay, and when in the hay, by forcing them open to a point at about right angles to their former position, a large quantity of hay may be held upon them; and it consists, first, in separately pivoted curved links, by which to operate the points, and, second, in the provision of an eccentric cam-lever to raise the spring-catch, by which the sliding-bar to which the curved links are pivoted is held in its different positions. In the drawings—

Figure 1 is a longitudinal section on the line $x\ x$, and

Figure 2 is a side elevation, with partial section on the broken plane indicated by the line $y\ y$.

A represents the tubular body or stock, which may be of any desired form, either round or angular, the latter form being represented, and may be constructed of any suitable material. B B are tines, hinged at $b\ b$ to pivots $b^1$ in the slots $a$, and formed with cavities $b^2$, in which are pivoted the curved links C, so formed and applied as to lessen the power required to open the points. D is a sliding-bar, to whose lower end, at $d\ d$, the upper ends of the links C are pivoted, and to whose upper end the elevating-rope is attached, through an aperture, $d'$. F is a spring-catch, of steel or other elastic material, which is rigidly attached at $e$, by screws or otherwise, to the stock A, and having a pin, $e'$, projecting laterally from its free end through an aperture in the stock A, so as to engage in a depression or notch, $d^2$, in the sliding-bar D when the tines are in their open position. The catch E is raised by the eccentric cam-lever F, which is pivoted at $f$ in a longitudinal slot in the enlarged upper end of the catch, and which is actuated by the rope or cord G, attached to the outer end of it, and passing through the eye $a$ on the outer end of the arm A', and down to a position within reach of the operator. By this rope the lever is raised, but it returns to its normal position by its own eccentricity, under pressure of the spring-catch.

Its operation is as follows: The fork being suspended in the ordinary manner, and the points B in their closed position, it is driven into the hay, by the foot or otherwise, a sufficient distance, when the bar D is forced down, and, by means of the outward pressure, the links C, and the vertical resistance of the hay, the tines are made to assume the position represented by red lines in fig. 1, when the stud $e$ springs into the depression $d^2$. The fork is then ready to be raised, and on reaching the required height the tines are released by retracting the spring-catch through the connections before explained. An additional hole may be provided in the sliding-bar, as indicated at $d^3$, to hold the tines in their closed position.

Having thus described my invention, what I claim as new, and desire to secure by Letters Patent, is—

1. The separately pivoted curved links C, in combination with the sliding-bar D and hinged tines B B, arranged and operating substantially as and for the purpose described.

2. The eccentrically pivoted cam-lever F, in combination with the spring-catch E $e$ and rope G, arranged and operating substantially as and for the purpose specified.

3. The arrangement of the arm A' $a$, rope G, and cam-lever F, substantially as set forth.

To the above specification of my new and useful improvement in horse hay-forks I have signed my hand this 16th day of July, A. D. 1867.

JOSHUA M. MANSFIELD.

Witnesses:
 OCTAVIUS KNIGHT,
 J. E. M. BOWEN.